Patented Jan. 19, 1943

2,308,801

UNITED STATES PATENT OFFICE 2,308,801

BRAZING FLUX COMPOSITION

John K. Anderson, Douglaston, Long Island, N. Y

No Drawing. Application March 28, 1941,
Serial No. 385,693

4 Claims. (Cl. 148—26)

The present invention relates to a brazing flux composition and more particularly to a flux for hard soldering or brazing and welding substantially all ferrous and non-ferrous metals and alloys.

The object of the invention centers about the provision of such a flux composition which protects the metal thoroughly from the oxidizing effect of the welding flame, prevents discoloration of the metal, cleanses as well as promotes the flowing of the weld metal, and aids in the homogeneity of the resulting weld itself so as to produce a finished weld free of pin holes or porosity to an extent much greater than can be accomplished with present known fluxes.

The brazing flux of my present invention, employed as customarily with so-called silver solder as the brazing material, may be used for the hard soldering or brazing and welding of all ferrous and non-ferrous metals and alloys, with the exception of aluminum and magnesium but including aluminum- and magnesium-containing alloys like the various aluminum bronzes. It has been suggested heretofore as in Patent No. 1,717,350 of June 11, 1929, to make a brazing flux of general utility and suitable for the brazing or soldering and welding of various metals, the brazing flux consisting of an alkali acid fluoride and an alkali tetraborate. In Patent No. 1,835,963 of December 8, 1931, the alkali tetraborate of this composition is replaced by a mixture of alkali carbonate and boric acid which form the alkali borate in situ. The flux of the first mentioned patent usually contains, however, a considerable amount of water of crystallization (in the tetraborate), which sometimes causes the brazed joint to be defective due to the presence of pin holes therein, and it was found desirable to employ the flux of the second mentioned patent wherein dry materials were used in preparing the flux. However, the resultant product was found hygroscopic and the mixing had to be carried out under special atmospheric conditions and the product had to be preserved free from moisture. A similar flux composition was suggested in Patent No. 2,174,551 of October 3, 1939. These prior flux compositions, in addition to the difficulties mentioned, suffer the disadvantage that they tend to crystallize on standing, particularly over a storage period, and have to be treated with hot water before use.

I have discovered that if an alkali boroformate, such as sodium boroformate, is compounded with an alkali acid fluoride, such as potassium acid fluoride, a flux is produced which, in addition to being serviceable for substantially all ferrous and non-ferrous metals and alloys, is effectively free of all of the stated disadvantages of these prior fluxes. The provision of such an improved flux composition is a prime object of my present invention.

I have further discovered that if this alkali acid fluoride, alkali boroformate flux be compounded with halogenides of metals, alkali metals or/and alkali earth metals, a resulting flux composition is produced which possesses (1) a high temperature indestructability giving the flux a wide range of temperature uses and better protecting the metal from the oxidizing effect of the welding flame, (2) greatly increased fluxing action enabling the weld or brazing metals to flow over a greater area, (3) a better metal oxide cleansing effect and (4) a slightly yet desirably lower temperature action. The provision of a flux composition of this character is a further prime object of my invention.

To the accomplishment of the first stated object, the base flux composition of the invention consists, as aforesaid, of an alkali boroformate compounded with an alkali acid fluoride. The ingredients may be varied within a wide range of proportions; and the flux mixture may consist of about 25%–75% by weight of the alkali acid fluoride and about 75%–25% of the alkali boroformate. A preferred example of the fluoride is potassium acid fluoride, and a preferred example of the boroformate is sodium boroformate as marketed by the Victor Chemical Works of Chicago, Illinois. These ingredients are suitably thoroughly mixed to produce a dry flux compound, in which event it may be subsequently mixed with cold water or the ingredients may be initially prepared by mixing the dry ingredients with water. This flux compound, utilizable for substantially all ferrous and non-ferrous metals and alloys, has no appreciable tendency to crystallize and harden on standing, may be used without being first digested with hot water, and produces a finished weld substantially free of pin holes or porosity.

To the accomplishment of the second stated prime object of the invention, this base flux composition is compounded with preferably a mixture of halogenides of metals, alkali metals or/and alkali earth metals. A mixture of these halogenides is preferred because different halogenides are serviceable for dissolving different metal oxides, and this flux to have a most universal and flexible use (so as to work on a variety of metals) should preferably have a mixture of the halogenides. The chlorides may be taken as a preferred example of the halogenides. The mixture of halogenides preferably comprises about 8% to 30% by weight of the flux compound. Preferably a metal chloride such as cupric or cuprous chloride is combined with alkali metal chlorides or alkali metal and earth alkali metal chlorides. By varying the percentage of the alkali metal and alkali earth metal halogenides, or by replacing some of them with a halogenide of cadmium, I may alter the melting point of the flux. By further adding up to 15% by weight of alkali borate to this compound, I can adapt the flux to the working of metals which are corroded in various stages.

An example of this flux composition is as follows:

| | Per cent |
|---|---|
| Potassium acid fluoride | 50 |
| Sodium boroformate | 30 |
| Cuprous chloride | 5 |
| Sodium chloride | 5 |
| Potassium chloride | 5 |
| Strontium chloride | 5 |

An example of a different combination of halogenides which may be used as the addition product to the base flux is as follows:

| | Per cent |
|---|---|
| Cupric chloride | 5 |
| Cadmium chloride | 5 |
| Barium chloride | 5 |
| Calcium chloride | 5 |

This flux composition may be varied within a wide range of the proportions. The flux mixture may consist, for example, of about 20% to 60% of potassium acid fluoride (as the example of the alkali acid fluoride), about 20% to 60% of sodium boroformate (as the example of the alkali boroformate), and 8% to 30% of the chlorides of the metal and the alkali metals, and for the alkali metals it will be understood that both alkali and alkali earth metals may be used.

Considering the chlorides as an example of the halogenides, the alkali metal chlorides may comprise chlorides of sodium, potassium, lithium, cesium and rubidium, and the alkali earth metal chlorides may comprise the chlorides of calcium, strontium, barium and magnesium. The alkali acid fluoride may be replaced by a neutral fluoride and/or a carbonate and/or an oxide and hydrofluoric acid. For the halogenides in any one of these examples, there may be used the chlorides, bromides or iodides, or a combination of these.

By adding the halogenides to the base flux, the flux is capable of protecting the metal thoroughly from the oxidizing effect of the welding flame, of preventing discoloration of the metal, of effecting a better cleansing action, and of promoting the flowing of the weld metal.

It will be understood that the modern requirements for a flux are very high due to the daily increasing number of alloys. Flux compositions, therefore, have to be varied depending on the melting point, coverage, viscosity, aging possibilities, oxidation effects, detergency, slag dissolving properties, surface tension, cleansing effect, metal flow action, and gas dissolving and oxide formation.

I have found that the flux of my present invention may be without difficulty adapted to these various requirements of service for a large variety of metals.

I claim:

1. A flux consisting of an alkali acid fluoride, an alkali boroformate and at least one halogenide selected from the class of metal halogenides, alkali metal halogenides and alkali earth metal halogenides.

2. A flux consisting of about 20% to 60% of an alkali acid fluoride, 20% to 60% of an alkali boroformate and about 8% to 30% of halogenides selected from the class of metal halogenides, alkali metal halogenides and alkali earth metal halogenides.

3. A flux consisting of about 20% to 60% of potassium acid fluoride, about 20% to 60% of sodium boroformate and 8% to 30% of chlorides selected from the class of metal chlorides, alkali metal chlorides and alkali earth metal chlorides.

4. A flux consisting of about 50% potassium acid fluoride, about 30% sodium boroformate and about 20% of chlorides selected from the class of metal chlorides, alkali metal chlorides and alkali earth metal chlorides.

JOHN K. ANDERSON.